(12) United States Patent
Schurmann et al.

(10) Patent No.: US 6,722,707 B1
(45) Date of Patent: Apr. 20, 2004

(54) LAPPED FLANGE FOR CONNECTING PIPES AND METHOD FOR PRODUCING SUCH A LAPPED FLANGE

(75) Inventors: Erich Schurmann, Sendenhorst (DE); Ernst Doring, Aachen (DE)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 0 days.

(21) Appl. No.: 10/019,157

(22) PCT Filed: Mar. 8, 2000

(86) PCT No.: PCT/EP00/01999

§ 371 (c)(1),
(2), (4) Date: Mar. 29, 2002

(87) PCT Pub. No.: WO00/75549

PCT Pub. Date: Dec. 14, 2000

(30) Foreign Application Priority Data

Jun. 8, 1999 (DE) .......................... 199 25 956
Mar. 1, 2000 (DE) .......................... 100 10 698

(51) Int. Cl.⁷ .............................. F16L 23/00
(52) U.S. Cl. .................. 285/414; 285/412; 285/415
(58) Field of Search ..................... 285/405, 412, 285/413, 415, 416

(56) References Cited

U.S. PATENT DOCUMENTS

| | | | | |
|---|---|---|---|---|
| 1,784,667 A | * | 12/1930 | Gillet | 411/532 |
| 2,234,119 A | * | 3/1941 | Halliburton | 285/328 |
| 2,911,239 A | * | 11/1959 | Marzolf, Sr. | 285/415 |
| 3,418,009 A | * | 12/1968 | Pollia | 285/39 |
| 3,515,416 A | * | 6/1970 | Pickert | 285/413 |
| 3,895,833 A | * | 7/1975 | Thiessen | 285/413 |
| 4,105,227 A | * | 8/1978 | Ekberg et al. | 285/412 |
| 4,900,072 A | * | 2/1990 | Bordner | 285/405 |
| 5,314,215 A | * | 5/1994 | Weinhold | 285/283 |
| 5,492,372 A | * | 2/1996 | Dranberg | 285/56 |
| 5,765,881 A | * | 6/1998 | Perner | 285/415 |
| 6,264,251 B1 | * | 7/2001 | Kunsman et al. | 285/405 |
| 6,315,335 B1 | * | 11/2001 | Seedorff | 285/415 |

* cited by examiner

Primary Examiner—Lynne H. Browne
Assistant Examiner—James M. Hewitt
(74) Attorney, Agent, or Firm—Bachman & LaPointe, P.C.

(57) ABSTRACT

A loose flange for connecting pipes, the flange having radially inwardly oriented and elastically deformable oblique surfaces. The clamping force capacity of the loose flange is improved as a result. A method for producing the loose flange is also disclosed.

22 Claims, 3 Drawing Sheets

LAPPED FLANGE FOR CONNECTING PIPES AND METHOD FOR PRODUCING SUCH A LAPPED FLANGE

FIELD OF THE INVENTION

The invention relates to a loose flange for connecting pipes at opposite pipe ends each provided with a collar, having an annular flange body which has a plurality of circumferentially distributed outer through-passage openings for fastening means.

The invention also relates to a method of producing a loose flange for a pipe connection, which has a plurality of circumferentially arranged outer through-passage openings.

BACKGROUND OF THE INVENTION

It is known, for the sealing connection of pipes, to use annular flanges with distributed through-passage openings in the region of pipe ends. The flanges are positioned as loose flanges in each case on an encircling collar of the pipe end and braced by means of bolts, guided through the circumferentially distributed through-passage openings, in conjunction with nuts positioned at free ends of said bolts, with the result that a fixed and sealing connection is produced between the ends of the two pipes. In this case, the loose flanges each butt against a pipe end on a side of the collar of the pipe end which is directed away from the opposite pipe ends.

Since the axial bracing forces prevail in the radially outward direction from the collars, it may be the case that the loose flanges move towards one another in an outer region and are thus deformed on a permanent basis. The flanges then have an undesired thrustoconical shaping. During the bracing of such a pipeline flange connection by the tightening of the bolts, the seal and the collars are compressed, the flanges are inverted and the screws are expanded.

In particular when loose flanges are used in pipelines made of polymer material, creep of the force-carrying elements, the collars, the seal and the loose flanges in particular, cannot be avoided, with the result that the sealing forces decrease. The clamping bolts or clamping screws, with their small amount of expansion, usually cannot compensate for the creep of the polymer-material parts. Although it would be possible for axially elastic loose flanges to compensate for the creep, such a desirably pliable flange would have the basic disadvantage mentioned above that, in the case of mechanical loading, the flange, in accordance with its low axial rigidity, would deform axially to a pronounced extent and/or be inverted. The effect of the associated conical deformation of the flanges is thereby intensified, which would result in the bearing surfaces for the screws tilting and thus in the screws being subjected to undesired eccentric loading.

SUMMARY OF THE INVENTION

It is thus an object of the present invention to develop a loose flange for a pipe connection so as to ensure defined axial resilient rigidity and deformability without the screw-bearing surfaces being inclined disadvantageously and the screws being subjected to eccentric loading as a result.

In order to achieve this object, the loose flange according to the invention, in conjunction with the preamble of Patent Claim 1, is characterized in that the flange body has an inner ring section and an outer ring section, a radially inner side of the inner ring section having, at least in certain regions, a circumferentially running groove of a predetermined depth.

The particular advantage of the loose flange according to the invention is that defined axial rigidity is ensured by the provision of a groove in an inner ring section of the flange body. The groove allows specific elastic deformability of the loose flange in a radially inner region of the same. The axial rigidity of the loose flange decreases from an outer region to an inner region of the same, with the result that an additional fastening means, namely a clamping bolt with a head or a screw, is always retained with predetermined surface-area abutment against the loose flange.

It is advantageously possible to prevent undesired "dishing" of the flange body or tilting of the outer ring section as a result of an excessively large tightening torque. Non-uniform bearing of the ends of the fastening means, in particular of a nut and of a screw head, on radial surfaces of the flange body may thus be reliably avoided.

According to a preferred embodiment of the loose flange, the groove is of V-shaped design and runs continuously in the circumferential direction. The contour of the groove-forming oblique surfaces may be of planar or curved design here. The shape of the groove depends on the desired deformation characteristics of the inner ring section. The shape of the groove depends on the geometry of the loose flange and/or on the predetermined desired clamping force of the flange connection.

In conjunction with a radial surface for the flange parts of the flange body which is directed towards the collar, the groove is shaped such that, with the flange being subjected to nominal loading, the establishing inversion or tilting of the outer ring section is compensated for, the radial surface of the flange body butting against the collar over its surface area, with a relatively low level of surface pressure being formed in the process.

According to a development of the loose flange, circumferentially distributed and radially inwardly projecting protuberances are arranged on an inner side of the inner ring section, said protuberances retaining the loose flange with clamping action at the pipe end. It is thus possible for the loose flange to be fixed on the pipe for installation purposes.

According to a development of the loose flange, on a side located opposite the oblique surface, the flange parts have radial surfaces with a prism-like surface structure which, when clamping screws are tightened, deform and level out such that when the predetermined tightening torque of the clamping screws is reached, the washers have reached their definitive position and it is no longer possible for them to be lowered any further. It is thus possible to see when the predetermined tightening torque of each screw has been reached by the position of the respective washer. Furthermore, the visibly deformed geometry gives an indication of prior use.

According to a development of the loose flange, circumferentially distributed clamping noses are arranged on an inner side of the outer through-passage openings, with the result that clamping screws are retained with clamping action in the through-passage openings. This facilitates, in particular, the vertical installation of the flange connection. These clamping noses, and also the protuberances on the inner side of the inner ring section, preferably consist of an elastic material, namely polymer material. If the loose flanges themselves are produced from polymer material, then the protuberances and/or clamping noses may simply be integrally formed thereon.

It is also an object of the present invention to specify a method of producing a loose flange for a pipe connection, with the result that a flange body with a clamping-force capacity which is stable over a long period of time is provided in a manner which is straightforward in production terms.

In order to achieve this object, the method according to the invention, in conjunction with the preamble of Patent Claim 18, is characterized in that two identical annular flange parts are formed separately by injection moulding or casting, with a radially inwardly oriented flattened portion being formed in the process, and in that, in a second step, the flange parts are connected to one another in an outer ring section, with a groove produced by the mutually facing flattened portions being formed in the process.

The particular advantage of the method according to the invention is the simplicity of production. Preferably identical flange halves are formed separately and then welded to one another with surface-area abutment of radial surfaces of an outer region section. The flange parts or flange halves are thus of straightforward geometrical shape, with the result that they can be produced with a relatively high throughput.

According to a preferred embodiment of the method according to the invention, the shaped parts are produced from a polymer material by injection moulding, it being possible for the fixed connection between the same to be easily produced by welding.

BRIEF DESCRIPTION OF THE DRAWINGS

Exemplary embodiments of the invention are explained in more detail hereinbelow with reference to the drawings, in which.

DETAILED DESCRIPTION OF THE INVENTION

The loose flange described hereinbelow serves for connecting pipe ends (not illustrated) each with a collar which butt against one another over their surface area directly or in a state in which they are separated by a seal. Each collar is assigned an annular loose flange, the internal diameter of the loose flange being smaller than the external diameter of the collar. The two loose flanges are aligned coaxially with one another and are braced in the axial direction by fastening means.

Figure 1:
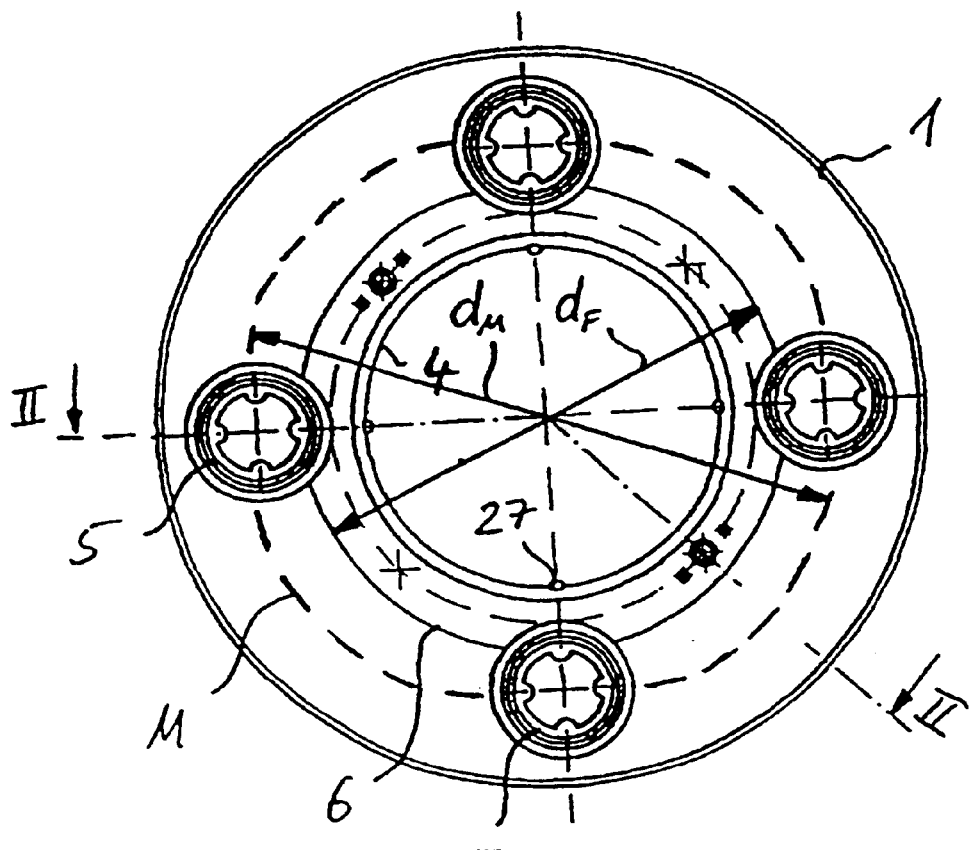
FIG. 1 shows a plan view of a first flange part.
Figure 2:
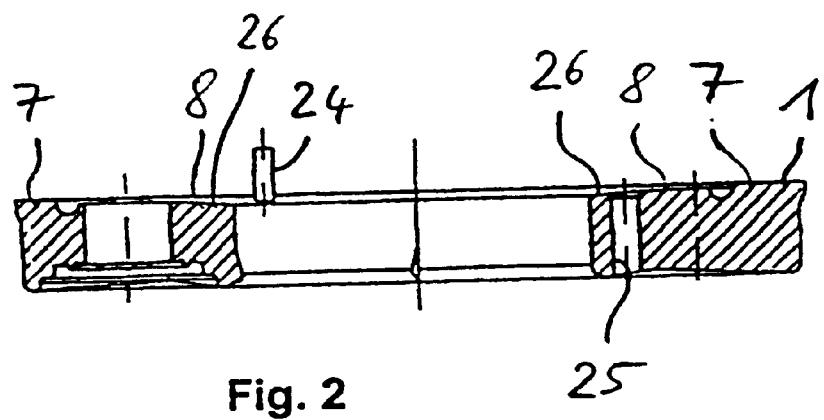
FIG. 2 shows a cross section through the first flange part along line II—II in FIG. 1.
Figure 3:
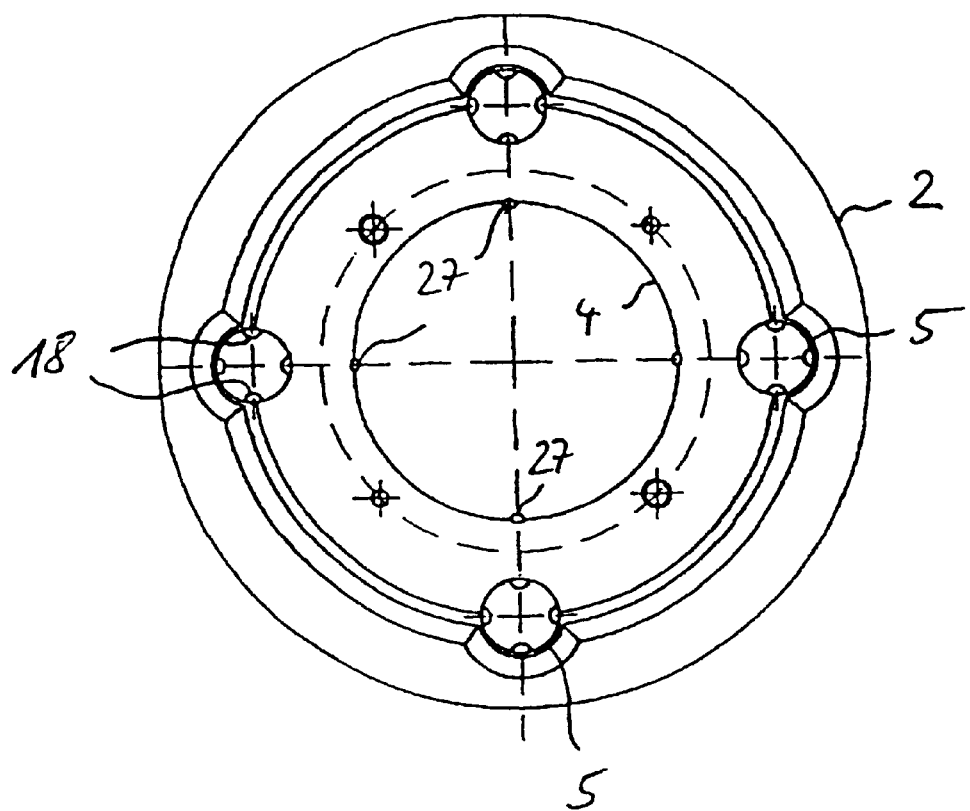
FIG. 3 shows a plan view of a second flange part.
Figure 4:
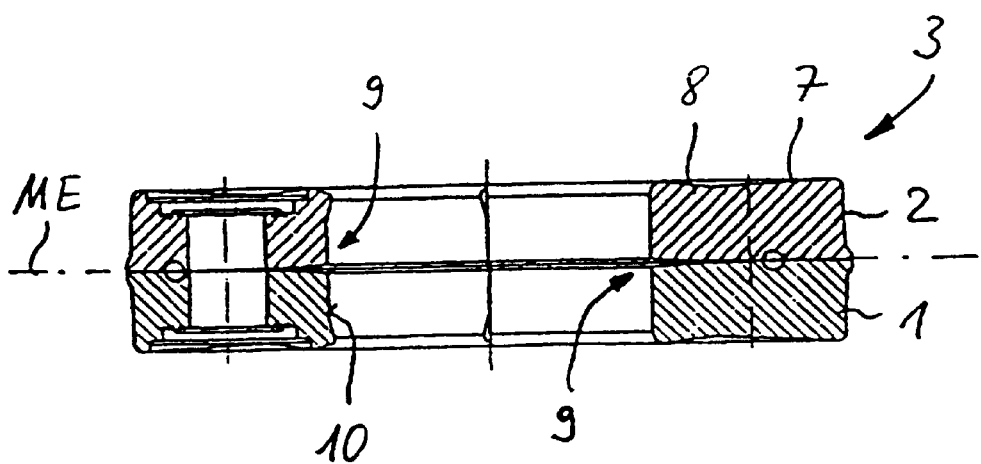
FIG. 4 shows a cross section through a flange body, formed by the first and second flange parts, along line II—II in FIG. 1.
Figure 5:
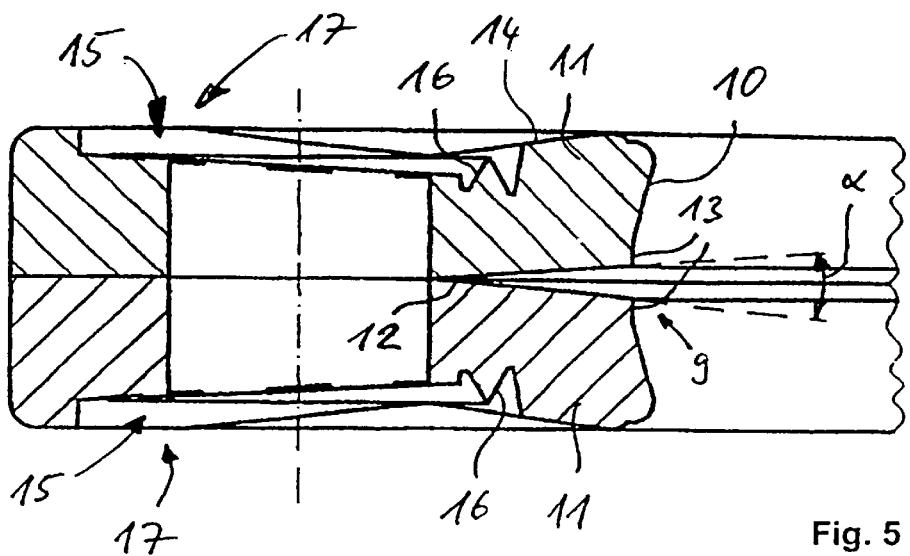
FIG. 5 shows an enlarged part of a detail from FIG. 4.
Figure 6A:
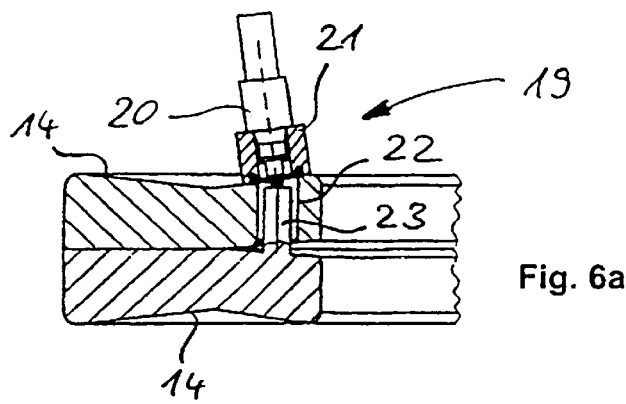
FIG. 6a shows a cross section of part of a flange body, provided with a sensor device, in a relieved position.
Figure 6B:
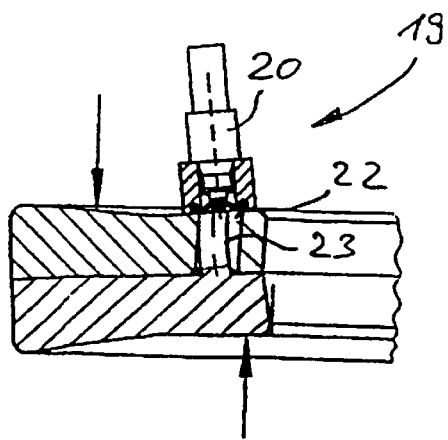
FIG. 6b shows a cross section of part of the flange body according to FIG. 6a in a clamping position.

FIG. 1 illustrates a first flange part 1, which is joined together with a second flange part 2, illustrated in FIG. 3, to form a flange body 3. The flange body 3 is of annular design and serves as a loose flange for butting against the collar. A central through-passage opening 4 has a diameter which is greater than the diameter of the pipes which are to be connected, on the one hand, and is smaller than the external diameter of the collar, on the other hand. The flange body 3 has circumferentially distributed outer through-passage openings 5 into which it is possible to fit in each case one bolt (not illustrated) with a head as fastening means. The bolts are fitted through the outer through-passage openings 5 of a first flange body 3 and are of such a length that the free end of the bolt engages through the corresponding through-passage opening 5 of the identical second flange body 3. Thereafter, the bolt may be brought into engagement with a nut at the free shank end, with the result that the flange bodies positioned on the collars in each case can be braced in relation to one another.

The flange body 3 has an outer ring section 7 and an inner ring section 8, the outer through-passage openings 5 being arranged essentially in the outer ring section 7. The flange parts 1 and 2 are fixed to one another in the outer ring section 7. In the inner ring section 8, which is adjacent in the radially inward direction, the flange parts 1 and 2 are designed to be spaced apart from one another in a relieved starting position, with the circumferentially running groove 9 being formed in the process. The groove 9 is of cross-sectionally V-shaped design and extends continuously in the circumferential direction on an inner side 10 of the flange body 3.

Alternatively, it is also possible for the groove 9 to be of interrupted design, the groove being arranged at least in a circle cutout of the flange body 3 in which there are no outer through-passage openings 5.

By virtue of the groove 9, the flange parts 1, 2 each form, in the inner ring section 8, an oblique surface 11 which is of elastically deformable design. The groove 9 is a rotationally symmetrical design and has a foot section 12 which runs along a root circle 6, the root circle 6 intersecting the outer through-passage openings 5. Alternatively, it is also possible for the root circle 6 to have a smaller radius, with the result that it is spaced apart radially from the outer through-passage openings 5. The size of the radius of the root circle 6 depends on the material property of the flange body 3 and/or the desired resilience of the oblique surface 11. As the radius of the root circle 6 increases, the resilience of the oblique surface 11 decreases, which reduces the prestressing-force compensation for setting the flange connection.

The invention advantageously makes it possible, by virtue of the depth of the groove 9, the thickness of the flange body 3 and the material properties thereof being predetermined, to set a predefined clamping force for the oblique surface 11, the oblique surface 11 compensating for a considerable amount of the clamping-force losses once it has been compressed in a clamping position of the flange body 3 in a spring-like manner when the flange connection is set.

The root circle 6, at the same time, forms a pivoting axis or a pivoting circle about which the oblique surface 11 can be pivoted. The groove 9 has an opening angle a which is located in a range of between 2° and 20°. The groove 9 preferably has an opening angle of 8°. A diameter $d_F$ of the root circle 6 is smaller than a hole-circle diameter $d_M$ of the flange parts 1, 2 and/or of the flange body 3. The diameter $d_F$ is preferably designed to be smaller, by the diameter of the outer through-passage opening 5, than the diameter $d_M$.

The flange parts 1, 2 are of the same thickness, with the result that the flange body 3 is of essentially symmetrical design in relation to a centre plane ME.

According to the invention, it is also possible for the groove 9 to be used for signalling a predetermined clamping position of the flange body 3. The width and the depth of the groove 9 may be coordinated with a predetermined tightening torque, by means of which the bolt is intended to be brought into engagement with the nut. The envisaged clamping position of the flange body 3 is signalled to the fitter in that border edges 13 of the opposite oblique surface 11 come into direct abutment.

A further criterion which may be used alternatively or in addition for determining when the envisaged clamping position is reached is constituted by the fact that an outer radial surface 14 of the oblique surface 11 has a prism-like surface structure 16 in certain regions, preferably in the region of a recess 15 for the screw head and/or the nut. The envisaged clamping position is reached in that, following abutment of the screw head and/or of the nut against the recess 15, which widens the outer through-passage opening 5 on the end side, and application of a clamping force, the prism-like elevations 16 are deformed plastically such that a planar radial surface 14 is formed. The now-reached clamping position corresponds to the predetermined tightening torque of the bolt.

The surface structure 16 may be of uniform or irregular design. The essential factor is that the resulting recesses, on average, fill a volume which corresponds to the volume of the rest of the radial regions 17 of the recess 15. The prism-like surface structure 16 is preferably assigned to a radially inwardly oriented radial region 17 of the recess 15.

The outer radial surfaces 14 are designed such that they diverge in the radially inwardly oriented direction in the initial state, with the result that, following engagement of the clamping bolt and displacement of the same into the clamping position, the head and the nut butt directly, with coaxial orientation, against the radial surfaces 14.

In order to facilitate overhead installation, the outer through-passage openings 5 have, in an edge region in each case, circumferentially offset clamping noses 18, on which the bolt is retained with clamping action following insertion into the through-passage opening 5.

In order to detect a decreasing clamping force once the flange connection has been set, one embodiment of the loose flange provides a sensor device 19, which has a pressure sensor 20 which is mounted in a mount 21 which projects essentially axially from an outer radial surface 14 of the oblique surfaces 11. The mount 21 is preferably integrally formed on the radial surface 14 of the oblique surfaces 11. The oblique surface 11, containing the mount 21, has a through-passage bore 22 through which a sensor bolt 23, which is connected integrally to the opposite oblique surfaces 11, can engage. Depending on the opening angle of the oblique surface 11, the pressure sensor 20 is actuated with abutment of the end surface of the sensor bolt 23. If the clamping force of the flange body 3 decreases, which is associated with a spreading action of the oblique surface 11, the sensor bolt 23 is displaced to an extent. If the changing extent exceeds a predetermined desired length outside the tolerance range, this triggers a signal, in the pressure sensor 20, which, following evaluation in an evaluation unit (not illustrated), serves for signalling a residual sealing force outside the tolerance range.

In order to produce the flange body 3, the flange parts 1 and 2 are produced separately from polymer material by injection moulding. The flange parts 1, 2 may consist of a thermoplastic or a preferably glass-fibre-reinforced thermoset polymer material. Alternatively, it is also possible for the flange parts 1 and 2 to consist of metal, in particular sheet metal.

In a following step, the two flange parts 1 and 2 are fixed to one another in the outer ring section 7 by welding. For centred positioning of the flange parts 1, 2 and/or for aligned arrangement of the outer through-passage openings 5 of the same, the flange parts 1, 2 have axially running centring bolts 24 and centring bores 25 in the inner ring section 8.

In order to form the later groove 9, the flange parts 1, 2 each have flattened portions 26 in an inner ring section 8.

Since the flange parts 1, 2 are of identical design, they may be produced using a single tool. This reduces the production costs and increases the throughput.

In order to facilitate overhead installation, the inner side 10 of the inner ring section 8 has circumferentially distributed protuberances 27, which project radially inwards and serve for securing the flange body 3 with clamping action at a pipe end.

Alternatively, it is also possible for the flange body 3 to be produced in one piece.

What is claimed is:

1. A loose flange for connecting two pipes at their ends, each pipe end having a collar, the flange comprising: an annular flange body (3) formed by two flange parts (1, 2), the body having a plurality of circumferentially distributed outer through-passage openings (5) for fastening means, wherein the body has an inner ring section (8) and an outer ring section (7), a radially inner side (10) of the inner ring section having, at least in certain regions, a circumferentially running groove of a predetermined depth, the groove being V-shaped in cross-section, wherein mutually facing oblique surfaces of the groove being designed such that they diverge in the radially inward direction, the loose flange thus preventing undesired tilting of the outer ring section when the flange undergoes excessive tightening torque.

2. Loose flange according to claim 1, characterized in that a foot section (12) of the groove (9) extends as far as a centre circle (M) of the flange body (3) at least in a region of the outer through-passage openings (5).

3. Loose flange according to claim 1, characterized in that the groove (9) extends continuously in the circumferential direction.

4. Loose flange according to claim 1, characterized in that the depth of the groove (9) is designed to be greater in the region of the outer through-passage openings (5) than in the regions located between the outer through-passage openings (5) in the circumferential direction.

5. Loose flange according to claim 1, characterized in that the opening angle ($\alpha$) of the groove (9) is located in a range of from 2° to 20°.

6. Loose flange according to claim 1, characterized in that the groove (9) extends symmetrically to a centre plane (ME) of the flange body (3).

7. Loose flange according to claim 1, characterized in that two flange parts (1, 2) which are connected to one another and each have at least one oblique surface (11) for forming the groove (9), the two oblique surfaces being directed towards one another.

8. Loose flange according to claim 1, characterized in that each oblique surface (11) is designed to be inclined in relation to the centre plane (ME) in the initial state such that, with nominal loading, the flange part (1, 2) comes into surface-area abutment with the collar.

9. Loose flange according to claim 1, characterized in that the outer through-passage openings (5) are arranged essentially in the outer ring section (7).

10. Loose flange according to claim 1, characterized in that projecting from an oblique surface (11) of a flange part (1, 2) is an axially running sensor bolt (23) which is mounted displaceably in a through-passage bore (22) of the opposite oblique surface (11), and in that the sensor bolt (23) can be brought into operative connection with a laterally provided pressure sensor (20).

11. Loose flange according to claim 1, characterized in that, for abutment of a fastening means against a radial surface (14), a flange part (1, 2) has a prism-like surface structure (16), of which the depth is coordinated with the predetermined tightening torque of the fastening means, with the result that this surface structure (16) is deformed in a planar manner when the predetermined tightening torque is reached.

12. Loose flange according to claim 1, characterized in that, on at least one end side, the outer through-passage opening (5) has a widened recess (15) for accommodating a head of the fastening means, and in that the distance between the radially inwardly oriented border edge of the recess (15) and the inner side (10) is coordinated with the groove (9) such that, when the surface-area abutment of the mutually facing oblique surfaces (11) of the flange parts (1, 2) is reached, the predetermined tightening torque of the operatively connected fastening means prevails.

13. Loose flange according to claim 12, characterized in that the recess (15) has the prism-like surface contour (16) in a radially inwardly oriented section.

14. Loose flange according to claim 1, characterized in that circumferentially distributed and radially inwardly projecting protuberances (27) are provided on an inner side (10) of the inner ring section (8) for securing the loose flange with a clamping action at the pipe end.

15. Loose flange according to claim 1, characterized in that circumferentially distributed clamping noses (18) are arranged on an inner side of the outer through-passage openings (5) for securing the fastening means with clamping action in the outer through-passage openings (5).

16. Use of the flange body according to claim 1, for abutment against the collar of a pipe end, the collars of the mutually facing pipe ends being pressed towards one another by means of bolts engaging through the outer through-passage openings (5), the flange parts (1, 2) of in each case one flange body (3) being pressed together in the process.

17. A method for producing a loose flange for a pipe connection, the flange comprising: an annular flange body (3) formed by two flange parts (1, 2), the body having a plurality of circumferentially distributed outer through-passage openings (5) for fastening means, wherein the body has an inner ring section (8) and an outer ring section (7), a radially inner side (10) of the inner ring section having, at least in certain regions, a circumferentially running groove (9) of a predetermined depth, the groove being V-shaped in cross-section, wherein mutually facing oblique surfaces of the groove being designed such that they diverge in the radially inward direction, the loose flange thus preventing undesired tilting of the outer ring section when the flange undergoes excessive tightening torque; wherein the two identical flange parts (1, 2) are formed separately by injection molding or casting, with a radially inwardly oriented flattened portion (26) being formed in the process, and in that in a second step, the flange parts (1, 2) are connected to one another at the outer ring sections (7), with the groove (9) produced by the mutually facing flattened portions (26).

18. Method according to claim 17, characterized in that the flange parts (1, 2) are formed, in certain regions, with axially running central bolts (24) and/or central bores (25), with the result that the flange parts (1, 2) are positioned in a flush manner in relation to one another and are then connected to one another.

19. Method according to claim 17, characterized in that the flange parts (1, 2) are injection moulded or pressed from a polymer material.

20. Method according to claim 17, characterized in that the flange parts (1, 2) are injection moulded or pressed from a thermoplastic or a glass-fibre-reinforced thermoset polymer material.

21. Method according to claim 17, characterized in that the flange parts (1, 2) are produced from a sheet-metal material.

22. Method according to claim 17, characterized in that the flange parts (1, 2) are welded to one another.

\* \* \* \* \*